Patented Oct. 25, 1938

2,134,333

UNITED STATES PATENT OFFICE 2,134,333

WAXLIKE SUBSTANCE AND PROCESS FOR PREPARING SAME

Michael Jahrstorfer, Mannheim, and Georg Schwarte, Ludwigshafen-on-the-Rhine, Germany, assignors to I. G. Farbenindustrie Aktiengesellschaft, Frankfort-on-the-Main, Germany No Drawing. Application July 28, 1933, Serial No. 682,670. In Germany August 6, 1932

17 Claims. (Cl. 87—19)

The present invention relates to wax-like substances and a process for preparing the same.

The waxes and wax-like substances hitherto known have in general the disadvantage that they have a comparatively low melting point so that in many cases they cannot be employed industrially.

Patent No. 1,834,056 describes a process for improving the qualities of bleached Montan wax by completely or partially converting the free organic acids present in the bleached wax into salts or esters or by converting the carboxyl groups of the said acids into other groups containing the —CO— group, which do not contain a carboxyl hydrogen atom, as for example ketones, anhydrides and the like.

We have now found that new, wax-like substances which are very valuable industrially and which have an especially high melting point can be obtained by subjecting mixtures essentially consisting of aliphatic acyl compounds, that is aliphatic carboxylic acids, anhydrides and esters of said acids, to a condensing-splitting treatment in the presence of catalysts capable of splitting off carbon dioxide from organic, oxygenated substances, thus forming direct carbon chains containing more carbon atoms than those of the initial material. The said acyl compounds comprise such substances in which the product of the number of carbon atoms multiplied by the number of the acyl groups is at least 10. Thus, for example, mono-acyl compounds suitable for the reaction contain at least 10 carbon atoms, and di-acyl compounds must contain at least 5 carbon atoms in their molecule.

By the term direct carbon chains we wish to define chains in which the carbon atoms are directly connected to each other and not by one or more other elements, such as oxygen or nitrogen.

It is frequently of advantage to subject the products simultaneously or subsequently to a hydrogenating treatment, preferably a catalytic hydrogenation by means of hydrogen, or to a chemical hydrogenation by means of, for example, zinc and hydrochloric acid, whereby mixtures of alcohols and/or hydrocarbons are formed.

The said mixtures of acyl compounds, suitable as initial materials for the process according to this invention comprise natural or synthetically prepared waxes or wax-like substances, i. e., mixtures of esters of high molecular acids with high molecular alcohols, as for example, beeswax, carnauba wax, flax wax, candelilla wax, shellac wax, cotton seed wax, Montan wax, spermaceti, sperm oil, wool fat or insect wax, or mixtures obtainable by more or less, extensive saponification of these substances and subsequent acidification of the soap mixtures, or fractions thereof, such as for example deresinified crude Montan wax, or mixtures of free acids obtainable from said waxes by saponification, removal of the alcohols by means of organic solvents and acidification of the remaining soaps. The esters of the wax acids obtainable from the waxes, as for example methyl, ethyl, glycol or glycerol esters of Montanic acids, or of the mixtures of acids of other waxes, are also suitable initial materials according to this invention. Similarly, conversion products of said waxes, such as oxidation products of Montan wax may be employed. The mixtures of said aliphatic acyl compounds also comprise fatty oils and fats, and fatty acid mixtures obtainable therefrom by saponification or splitting, from liquid to solid high molecular oxidation products of natural or synthetically prepared aliphatic hydrocarbons, fatty acids or oils, fats, pitch and the like. The fatty oils comprise for example olive oil, coconut oil, castor oil, linseed oil, arachis oil, cotton seed oil, rape oil, sunflower oil, beef tallow, palm oil and palm kernel oil, sesame oil and soya bean oil. The fatty acid mixtures obtainable by the saponification of said fats or oils, or hardened oils or fats of the said kind, may also be used. Train oil, seal oil and whale oil, and mixtures of carboxylic acids obtainable therefrom by splitting are also very suitable. Products obtainable by oxidation, for example by means of oxygen containing gases, such as air, nitrogen oxides or by acids such as nitric acid, especially in the liquid phase, of from solid to liquid high molecular paraffin hydrocarbons, as for example, hard or soft paraffin waxes, petroleum hydrocarbons, heavy oils, hydrogenation products of coals and tars are eminently suitable. Oxidation products derived from fats or oils of vegetable or animal origin, as for example, soya bean oil, olive oil, castor oil or train oils, may also be employed. These oxidation products essentially consist of mixtures of high molecular fatty acids together with smaller or greater amounts of aldehydes, ketones, lactones, esters and estolides depending on the working conditions employed.

The process according to this invention is carried out by heating the initial materials to temperatures between about 100 and about 450° C., preferably between about 170° and 360° C. with an addition of catalysts capable of splitting off carbon dioxide, until no more carbon dioxide is split off, that is usually from 1 to 12 hours. The said catalysts capable of splitting off carbon dioxide comprise for example cobalt, nickel, iron, manganese, molybdenum, copper, zinc, chromium and tungsten, these solid, non-alkali forming metals being employed in the metallic form, for example as constructing materials for the reaction vessels, as inner coatings of said vessels or as filling materials (Raschig rings, shavings and the like) or also as powders. These metals may also be employed in the form of oxides or sulphides, such as molybdenum or tungsten sulphides. Aluminum oxide, mixtures and alloys of said metals are also suitable as catalysts. It is often advantageous to distribute the catalysts on carrier substances having large surface area, as for example kieselguhr, silica gel, pumice, active carbon, burnt clay, bleaching earth, chamotte, or fire clay, or to activate them by the addition of from about 1 to about 5 per cent by weight of alkali metal (Na, K, Li) or alkaline earth metal oxides (Ba, Ca, Sr). If the catalysts are used in the form of metal powders or shavings or as oxides or sulphides, they are preferably employed in an amount corresponding to between about 0.2 and about 10 per cent the weight of the initial materials.

It is especially advantageous to carry out the reaction in an autoclave, while maintaining a pressure between about 2 and about 30 atmospheres, preferably between about 5 and about 20 atmospheres. Since carbon dioxide is split off during the reaction the necessary pressure is produced thereby and is maintained by releasing it from time to time.

When the reaction is completed, the reaction product is separated from the catalyst by filtration. The wax-like products thus obtained may be directly employed in the industries which work up waxes. In may cases, however, it is advantageous to subject the products first formed to hydrogenation.

As catalysts for the catalytic hydrogenation may be mentioned solid metals, known as hydrogenation catalysts, and oxides or sulphides thereof, for example nickel, copper or cobalt, iron, alloys such as molybdenum-chromium-nickel, copper-manganese, molybdenum-zinc, tungsten sulphide, molybdenum sulphide, oxides of all the aforesaid metals, which catalysts may be activated by small amounts of alkali metal or of alkaline earth metal oxides, as described for example in the British Specification No. 356,731. The catalysts may, also in this case, be precipitated on carrier substances having large surface area. The general working conditions depend on the hydrogenation catalysts employed; usually temperatures between about 100° and about 500° C., preferably between 150° and 450° C., and pressures between about 10 and about 1000, preferably between 30 and 300 atmospheres are employed.

It is of great advantage in the process according to the present invention to select catalysts which not only effect the formation of compounds with carbon chains of high molecular weight but which are also capable, in the presence of hydrogen, of effecting the reduction into alcohols or hydrocarbons. Most of the aforesaid catalysts, especially those containing nickel or tungsten sulphide, are suitable for this purpose.

The new products obtainable by said subsequent hydrogenation usually are colourless wax-like substances which have a melting point above 85° C.

The catalytic conversion of the said initial materials into compounds with the said carbon chains takes place with good yields and at the same time a far-reaching purification of the products is effected which rise with the intensity of the treatment as regards duration, pressure and quantity of hydrogen employed, so that from the initial materials, which are often brown or black in colour, pale yellow, in many cases even colourless, wax-like substances can be obtained which may have also a different hardness, depending on the nature of the initial materials and catalysts employed and on the working conditions, a catalyst containing iron, for example, furnishing in the heat treatment usually products of a greater hardness than can be obtained with the aid of a copper catalyst.

Especially valuable products are obtained by converting Montan wax or the ester-bearing mixtures obtainable by the treatment of Montan wax with chromic acid or other oxidizing agents, such as nitric acid, into compounds with carbon chains of high molecular weight, the latter then being subjected to catalytic hydrogenation under such conditions that mixtures are obtained containing not only alcohols but also hydrocarbons. Generally speaking the Montan wax employed need not be subjected to a purification before the treatment because during the catalytic treatment a far-reaching purification and decolourization take place. In a similar manner waxes of the nature of carnauba wax, or their conversion products, in particular saponification products, may be converted into valuable very hard wax-like masses.

The process is also very convenient for the working up of train oils, as for example seal oil and whale oil, or the mixtures of fatty acids obtainable therefrom. The said initial materials may be first hardened in the usual manner, the resulting solid products being subjected to the catalytic treatment at high temperatures.

The wax-like products obtainable according to this invention may be employed either alone or together with other substances, as for example natural waxes or wax-like substances, such as stearine or paraffin wax, in all branches of industries which work up waxes. In particular they are suitable for the preparation of shoe creams and polishing compositions, and they may also be employed for dressing and impregnating textile materials of all kinds, such as wool, cotton, artificial silk, silk and paper. By reason of their especially high melting point and their hardness, they are especially suitable for employment in cases when great claims are made on the stability of the waxes such as is the case, for example, when they are to be moulded. They may also be employed in order to harden lower quality readily fusible waxes, wax-like substances or hydrocarbon waxes, such as paraffin wax, or polychlorinated naphthalene. By reason of their neutral character they may also be employed with advantage either alone or together with mineral oils and the like as lubricants for machines and the like. Hydrocarbons obtained according to the present invention may find useful application as insulating materials in electric devices or outfit, for example as insulations or impregnations of electric cables, coils, magnetic cores, condensers and the like.

It will be easily understood that, since the initial materials always are mixtures of acyl compounds, the resulting products also constitute mixtures, or at least compounds in which the new, long carbon chains are formed from different original shorter chains.

The following examples will further illustrate the nature of this invention but the invention is not restricted to these examples. The parts are by weight.

*Example 1*

1000 parts of a brown-coloured Montan wax which has been obtained by incomplete bleaching, with chromic acid according to the British Specification No. 305,552 and which has a melting point of 83° C., an acid value of 107 and a saponification value of 143 are heated for 12 hours to 310° C. while stirring with 200 parts of kieselguhr and 30 parts of iron powder; if the temperature be raised for example to 360° C. the reaction requires a much shorter period of heating. In this manner a brown product is obtained which, after filtering off the catalyst, has a melting point of above 100° C. By catalytic hydrogenation of this product at 300 atmospheres and 250° C. while employing a catalyst obtainable by applying 20 parts of nickel onto 80 parts of kieselguhr, a pure colourless hard product is obtained which shows the following characteristics:—

| | |
|---|---|
| Melting point °C | 104 |
| Acid value | 0 |
| Saponification value | 0 |
| Hydroxyl value | 2 |

This product is therefore practically a pure hydrocarbon of high melting point. The product has the valuable property of considerably raising the melting point of paraffin wax, stearic acid, aliphatic alcohols of high molecular weight, beeswax, tallow and the like, when it is added thereto in small amounts, as for example from 2.5 to 5 per cent, by weight of the said materials.

*Example 2*

1000 parts of a brown coloured product which has been obtained by incompletely bleaching Montan wax with chromic acid according to the British Specification No. 305,552 and which has an acid value of 98 and a saponification value of 146 are heated to about 280° C. in an autoclave with 50 parts of an iron powder obtained by the thermal decomposition of iron carbonyl and with 10 parts of a hydrogenation catalyst consisting of nickel deposited on 40 parts of kieselguhr. After heating for 5 hours, the reaction mixture is further heated with hydrogen under a pressure of 200 atmospheres until no more hydrogen is absorbed. The wax-like product thus obtained has the following constants:—

| | |
|---|---|
| Melting point °C | 93 |
| Acid value | 0 |
| Saponification value | 4.2 |

*Example 3*

1000 parts of a dark brown coloured product having an acid value of 110 and a saponification value of 124 which has been obtained by incompletely saponifying deresinified Montan wax with caustic soda solution, distilling off the unsaponifiable constituents in vacuo with the aid of steam and acidifying the residue with mineral acid, are heated with 100 parts of iron chips in an autoclave for 6 hours at 280° C. while stirring, the pressure being released from time to time so that a pressure of from 5 to 25 atmospheres is maintained. Hydrogen under a pressure of 200 atmospheres is then pressed into the autoclave and the reaction mixture is further stirred for 2 hours, the temperature being allowed to fall slowly to 270° C. A reaction product is thus obtained having an acid value of 5.6 and a saponification value of 8.4.

The reaction product is separated from the iron chips and treated at 270° C. under a pressure of 200 atmospheres with hydrogen in the presence of a catalyst consisting of 20 parts of nickel, 80 parts of kieselguhr and 20 parts of active charcoal containing a little zinc chloride. In this manner a very hard product of pale yellow colour and having the following characteristics is obtained:—

| | |
|---|---|
| Melting point °C | 100 |
| Acid value | 0 |
| Saponification value | 1.5 |

The product is especially suitable for hardening soft paraffin wax.

*Example 4*

1000 parts of a product having a melting point of 73° C., an acid value of 17 and a saponification value of 175 obtainable by incompletely bleaching Montan wax with chromic acid according to the British Specification No. 305,552 and esterifying from about 80 to about 90 per cent of the free wax acids present with methyl alcohol for example according to the British Specification No. 296,145 are treated in an autoclave at 270° C. while stirring with 70 parts of iron powder prepared from iron carbonyl, care being taken that the pressure does not rise above 20 atmospheres. A pale brown reaction product is obtained having a belting point of 88° C. By catalytic hydrogenation with hydrogen while employing a nickel-kieselguhr catalyst as described in Example 3 at 250° C. under a pressure of 20 atmospheres, a product is obtained having a melting point of 95° C., an acid value of 0 and a saponification value of 3.

*Example 5*

1000 parts of grey carnauba wax having an acid value of 9 and a saponification value of 80 are heated to from 270° to 290° C. with 100 parts of iron powder in an autoclave for 5 hours while stirring, the pressure which develops being released from time to time to from 10 to 30 atmospheres. The ester value of the initial product falls from 72 to 14. By hydrogenating the reaction product in the presence of a nickel-kieselguhr catalyst as described in Example 3, a wax-like product of pale colour is obtained which has a melting point of 80° C., an acid value of 0 and a saponification value of 3. By distilling off the constituents of low boiling point, a hard wax-like product of white-yellow colour and having a melting point of 90° C. may be obtained in an amount of about 60 per cent of the crude product.

*Example 6*

1000 parts of a Montan wax bleached with the aid of chromic acid and having an acid value of 110, a saponification value of 143 and a melting point of 84° C. are heated for 10 hours at from 280° to 300° C., while stirring, together with 100 parts of pulverulent cobalt prepared by the reduction of cobalt carbonate. The brown reaction product having an acid value of 5.6, a saponification value of 8.4 and a melting point of 94° C. is heated in an autoclave together with 10 per cent by weight of the product of a hydrogenation catalyst, consisting of nickel deposited on kieselguhr, at 250° C. and at a pressure of 100 atmospheres of hydrogen whereby a pale product is obtained which consists mainly of hydrocarbons and has an acid value of zero, a saponification value of 1.4 and a melting point of 96° C.

*Example 7*

Montan wax bleached by oxidation with chromic acid is fused and then passed at 310° C. over iron chips while pumping the melt in a cycle over the chips until the acid and saponification values are almost zero. The resulting mixture of ketones is then subjected to hydrogenation with the aid of a nickel catalyst and while passing hydrogen in finely divided columns through the fused mixture of ketones.

*Example 8*

4500 parts of Montan wax oxidized with the aid of nitric acid and having an acid value of 175, a saponification value of 195 and a melting point of 77° C. are stirred for several hours at 300° C. with 400 parts of iron powder obtained by the decomposition of iron carbonyl. By heating the resulting mixture which has an acid value of 11.2, a saponification value of 18.2 and a melting point of 95° C., to 300° C. in the presence of 20 per cent by weight of the mixture of a hydrogenation catalyst consisting of nickel deposited on kieselguhr and at a pressure of 200 atmospheres of hydrogen, a pale brownish product is obtained which has a saponification value of 4.2, an acid value of zero and a melting point of 96° C.

*Example 9*

Yellowish brown Montan wax, prepared by incompletely bleaching Montan wax with chromic acid in the ratio of about 75 parts of $CrO_3$ per 100 parts of Montan wax, is heated with iron as described in the foregoing examples, whereby ketones are formed from the esters and carboxylic acids of the wax. 10 parts of the resulting brown product, which has an acid value of 4, a saponification value of 14 and a melting point of 97° C. are dissolved in 100 parts of anhydrous amyl alcohol and then after heating the solution to its boiling point and while stirring, 5.5 parts of sodium in small pieces are introduced. After the reaction in which the sodium compounds of amyl alcohol and of the secondary alcohols corresponding to the initial ketones are formed is completed, the reaction mixture is allowed to cool and the still liquid mixture is introduced into dilute aqueous sulphuric acid in such a quantity that the mixture remains acid. The upper layer comprising the said alcohols and some sodium sulphate is then separated from the aqueous acid solution of sodium sulphate by drawing off the latter and is then subjected to distillation with the aid of steam whereby the amyl alcohol is distilled off and sodium sulphate is dissolved from the fused secondary alcohol. After drawing off the salt solution from the still and repeating the said distillation until the product is free from salt, a product is obtained which consists mainly of the secondary alcohols corresponding to the initial ketones and has an acid value of zero, a hydroxyl value of 95 and a melting point of 88° C.

*Example 10*

3300 parts of Montan wax bleached and oxidized by means of chromic acid and having an acid value of 118, a saponification value of 145, and a melting point of 83° C. is heated for 6 hours at 310° C., while stirring, together with 100 parts of cast iron powder. The reaction product has an acid value of 4, a saponification value of 15 and a melting point of 96. It is heated at 380° C. without removal of the iron powder at a pressure of 200 atmospheres of hydrogen which is passed through the autoclave at the ratio of 4 cubic meters per hour during 4 hours. A pale, hard product is obtained which has an acid value of zero, a saponification value of zero and a melting point of 100° C.

*Example 11*

300 parts of deresinified Montan wax are stirred at 320° C. during 15 hours with 200 parts of iron shavings. The reaction product which has an acid value of 5.6 and a saponification value of 15 is freed from iron by decantation and is then mixed with 80 parts of molybdenum sulphide precipitated on 160 parts of kieselguhr. The mixture is then heated to 380° C. at a pressure of 200 atmospheres of hydrogen during 6 hours. A brown product is thus obtained which mainly consists of hydrocarbons, has a melting point of 94° C., an acid value of 1.4 and a saponification value of 2.8. By repeating the hydrogenation after adding 125 parts of a catalyst consisting of 25 parts of nickel precipitated on 100 parts of kieselguhr, a white product having an acid value of zero, a saponification value of zero and a melting point of 95° C. is obtained.

*Example 12*

4750 parts of Montan wax oxidized by means of nitric acid and containing a considerable proportion of polycarboxylic acids, having an acid value of 210, a saponification value of 236 and a melting point of 76° C., are stirred at 290° C. with 400 parts of iron powder. The resulting product has an acid value of 7, a saponification value of 14 and a melting point of 97° C. The product is freed from iron by decantation and is then mixed with 400 parts of a catalyst consisting of 100 parts of copper precipitated on 300 parts of kieselguhr. The mixture is then heated for 4 hours at 370° C. at a pressure of 200 atmospheres of hydrogen. A hard and pale mixture of hydrocarbons is thus obtained which has an acid value and a saponification value of zero and a melting point of 102° C.

If the treatment with hydrogen is carried out at 425° C. a white product having a melting point of 95° C. is obtained which is considerably more flexible and plastic than the product prepared at 370° C.

*Example 13*

1000 parts of a product obtained by oxidizing hard paraffin wax by blowing with air which is liquid at ordinary temperature and which has an acid value of 242 and a saponification value of 256 are converted into a mixture of ketones by heating for four hours at about 200° to 250° C. in an iron autoclave with 50 parts of iron powder obtained by decomposing iron carbonyl. The resulting product having the following characteristics:—

Acid value _____ 7
Saponification value_____ _____ 11.2
Melting point_____ _____°C__ 56 is then hydrogenated during 3 hours with hydrogen at 175° C. under a pressure of 200 atmospheres in the presence of 8 per cent of cobalt catalyst prepared by heating cobalt carbonate for 12 hours at 360° C. in a current of hydrogen, a pale yellow mixture of high molecular alcohols being obtained having the following characteristics:—

Acid value _____ 1.4
Saponification value _____ 7
Hydroxyl value _____ 104
Melting point _____°C__ 68

By working at higher temperatures, such as 330° C., with the employment of 4 per cent, by weight of the product, of a nickel catalyst prepared from 1 part of nickel carbonate and 3 parts of a bleaching earth, a product is obtained which consists mainly of paraffin wax.

*Example 14*

600 parts of a tall oil hardened with hydrogen in the presence of a catalyst consisting of nickel and kieselguhr and having the characteristics:—

Acid value _____ 172
Saponification value _____ 176
Melting point _____°C__ 58 are heated at 260° C. for 4 hours with 50 parts of iron powder obtained by decomposing iron carbonyl. In this manner a mixture is obtained having the following characteristics:—

Acid value _____ 35
Saponification value _____ 46
Melting point _____°C__ 76

This, without separating the catalyst, is mixed with 50 parts of a nickel-kieselguhr catalyst containing 20 per cent of nickel and then treated for 5 hours with hydrogen under a pressure of 80 atmospheres at 270° C. The resulting melt is then filtered and a colourless wax-like product is obtained which consists mainly of hydrocarbons and has the following characteristics:—

Acid value _____ 0
Saponification value _____ 1.4
Melting point _____°C__ 67

*Example 15*

600 parts of beef tallow having the characteristics:—

Acid value _____ 0
Saponification value _____ 189
Melting point _____°C__ 47 are treated at from 230° to 260° C. in a closed vessel with 50 parts of iron powder while stirring. After about 3 hours a product is obtained having the characteristics:—

Acid value _____ 4.2
Saponification value _____ 11.2
Melting point _____°C__ 62 which is hydrogenated for 3 hours with hydrogen at 300° C. under a pressure of 30 atmospheres while adding a catalyst consisting of molybdenum and chromium; an almost colourless mixture consisting mainly of paraffin waxes and having a melting point of 63° C. is obtained.

The catalyst is prepared as follows:—
100 parts of animal charcoal are impregnated with an aqueous solution of 1 part of concentrated phosphoric acid and then with a concentrated solution of 3 parts of an aqueous solution of chromium nitrate and 10 parts of ammonium molybdate until the aqueous solution has been completely absorbed by the animal charcoal. The resulting product is dried at 110° C. and reduced for from 5 to 10 hours in a current of hydrogen at from 360° to 450° C.

*Example 16*

600 parts of olive oil are heated at a temperature between 230° and 270° C. with 50 parts of iron powder derived from iron carbonyl for 4 hours in an autoclave. In this manner a reaction product having the characteristics:—

Acid value _____ 4.2
Saponification value _____ 14
Melting point, about _____°C__ 40 is obtained. By catalytic hydrogenation of this product in the presence of a nickel catalyst at 250° C. and a hydrogen pressure of 80 atmospheres during 8 hours, a colourless product similar to paraffin wax and having the characteristics:—

Acid value _____ 0
Saponification value _____ 2.8
Melting point _____°C__ 63 is obtained.

The nickel catalyst may be prepared as follows:—

A solution of nickel nitrate or nickel sulphate has added thereto an amount of kieselguhr corresponding to the nickel salt employed, an aqueous solution of soda or ammonium carbonate being introduced until the nickel salt has been completely precipitated as nickel carbonate. The precipitate is filtered free from the aqueous solution and thoroughly washed with water; it is then dried at 110° C. and reduced for from 2 to 5 hours in a current of hydrogen at between 450° and 550° C.

*Example 17*

1000 parts of a crude liquid mixture of ill-smelling dark coloured fatty acids derived from train oil and having an acid value of 160 and a saponification value of 186 are heated at 110° C. in an autoclave with 50 parts of iron powder and 100 parts of a nickel-kieselguhr catalyst having a content of 20 per cent of metallic nickel for an hour in the presence of hydrogen under a pressure of 200 atmospheres while stirring. The hardened product is then treated at 270° C. for two hours while stirring without pressure of hydrogen, the resulting product then being hydrogenated at the same temperature and without the addition of a new catalyst under a hydrogen pressure of 200 atmospheres. A product consisting of saturated hydrocarbons is obtained which is of pale yellow colour and has the characteristics:—

Acid value _____ 0
Saponification value _____ 2.8
Melting point _____°C__ 68

*Example 18*

5000 parts of seal oil having an acid value of 14 and a saponification value of 196 are treated in the presence of 300 parts of a nickel-kieselguhr catalyst having a nickel content of 20 per cent for an hour at 140° C. under a pressure of hydrogen of 20 atmospheres, and then heated at 290° C. while stirring and without the employment of hydrogen or pressure, after the addition of 200 parts of iron powder. A product having the characteristics:—

Acid value _____ 1.4
Saponification value _____ 5.6
Melting point _____°C__ 73 is obtained. This is treated for 8 hours with hydrogen under a pressure of 200 atmospheres at 185° C. in the presence of 8 per cent of metallic nickel as catalyst. A wax-like mass consisting mainly of alcohols is obtained having a pale yellow colour and the following characteristics:—

| | |
|---|---|
| Acid value | 0 |
| Saponification value | 0 |
| Hydroxyl value | 91 |
| Melting point °C | 75 |

If the second hydrogenation be carried out at 290° C. under a hydrogen pressure of 200 atmospheres, a colorless product similar to paraffin wax and having a melting point of 66° C. is obtained. If a mixture of ketones obtained from oxidized Montan wax by treatment with catalysts at elevated temperatures be added to the mixture of ketones to be hydrogenated, paraffin waxes of higher melting point, as, for example, above 80° C., are obtained.

The products similar to paraffin wax obtained in the said manner are eminently suitable for the preparation of polishing compositions and may be used instead of ozokerite. They are far superior, for example, to ozokerite in its property of increasing the oil absorption and imparting to the mass a flexible salve-like appearance. In many cases only half as much of the products obtainable according to this invention are necessary to produce a certain result as of ozokerite. For example a mixture of 30 parts of a product obtainable according to the German Specification No. 563,394 (which consists of a mixture of about 2 parts of montanic acid glycol ester and 1 part of montanic acid calcium salt), 40 parts of ordinary paraffin wax having a melting point of from 50° to 52° C. and 600 parts of a benzine fraction boiling between about 140° and 170° C. requires an addition of 30 parts of ozokerite in order to yield a salve-like mass of good consistency. The same result is obtained by the addition of only 15 parts of the wax-like product obtainable according to the first paragraph of this example.

By adding a large amount of the said wax-like product to hard wax and ordinary paraffin wax, it is possible to increase the oil absorption to an extraordinary degree so that solid polishing compositions containing only 14 per cent of solid constituents may be prepared.

Such a mixture consists for example of 30 parts of a product obtainable according to the said German Specification No. 563,394 (consisting of about 2 parts of montanic acid glycol ester and 1 part of montanic acid calcium salt), 40 parts of ordinary wax having a melting point of from 50° to 52° C., 700 parts of a benzine fraction boiling between 140° and 170° C. and 30 parts of the said wax-like product.

The mass has a good salve-like consistency and an excellent capacity for combining with oil. If the wax-like product in the said mixture be replaced by ozokerite, however, a soft semi-fluid mass is obtained which is unsuitable as a polishing composition.

What we claim is:—

1. The process for the production of wax-like substances which comprises subjecting a mixture of aliphatic acyl compounds, in which the product of the number of carbon atoms multiplied with the number of acyl groups is at least 10, to a condensing-splitting treatment in the liquid phase in the presence of a catalyst capable of splitting off carbon dioxide from organic oxygenated substances, thus forming direct carbon chains containing more carbon atoms than those of the initial oxygenated compound, the oxygen containing group of the reaction product being hydrogenated.

2. The process for the production of wax-like substances which comprises subjecting a mixture of aliphatic acyl compounds, in which the product of the number of carbon atoms multiplied with the number of acyl groups is at least 10, to a condensing-splitting treatment in the liquid phase in the presence of a catalyst capable of splitting off carbon dioxide from organic oxygenated substances, at a temperature between about 100 and about 450° C., thus forming direct carbon chains containing more carbon atoms than those of the initial oxygenated compound the oxygen containing group of the reaction product being hydrogenated.

3. The process for the production of wax-like substances which comprises subjecting a mixture of aliphatic acyl compounds, in which the product of the number of carbon atoms multiplied with the number of acyl groups is at least 10, to a condensing-splitting treatment in the liquid phase in the presence of a catalyst capable of splitting off carbon dioxide from organic oxygenated substances at a temperature between about 100 and about 450° C. and at a pressure between about 2 and about 30 atmospheres, thus forming direct carbon chains containing more carbon atoms than those of the initial compounds, the reaction product being subjected to a catalytic hydrogenation, whereby the oxygen containing group of the reaction product is hydrogenated.

4. The process for the production of wax-like substances which comprises subjecting a mixture of aliphatic acyl compounds, in which the product of the number of carbon atoms multiplied with the number of acyl groups is at least 10, to a condensing-splitting treatment in the liquid phase in the presence of a catalyst essentially consisting of iron, thus forming direct carbon chains containing more carbon atoms than those of the initial compounds the oxygen containing group of the reaction product being hydrogenated.

5. The process for the production of wax-like substances which comprises subjecting a mixture of aliphatic acyl compounds, in which the product of the number of carbon atoms multiplied with the number of acyl groups is at least 10, to a condensing-splitting treatment in the liquid phase in the presence of a catalyst essentially consisting of iron, at a temperature between about 170° and about 360° C. and at a pressure between about 2 and about 30 atmospheres, thus forming direct carbon chains containing more carbon atoms than those of the initial compounds the oxygen containing group of the reaction product being hydrogenated.

6. The process for the production of wax-like substances, which comprises subjecting a mixture of aliphatic acyl compounds, in which the product of the number of carbon atoms multiplied with the number of acyl groups is at least 10, to a condensing-splitting treatment in the liquid phase in the presence of a catalyst essentially consisting of iron, at a temperature between about 170° and about 360° C. and at a pressure between about 2 and about 30 atmospheres, thus forming direct carbon chains containing more carbon atoms than those of the initial compounds, the reaction product being subjected to a catalytic hydrogenation at about 200 atmospheres and about 370° C., in the presence of a catalyst essentially consisting of nickel, precipitated on kieselguhr, whereby the oxygen containing group of the reaction product is hydrogenated.

7. The process for the production of wax-like substances which comprises subjecting an oxidation product of a wax containing carboxylic acids to a condensing-splitting treatment in the liquid phase in the presence of a catalyst capable of splitting off carbon dioxide from organic oxygenated substances, thus forming direct carbon chains containing more carbon atoms than those of the initial oxygenated compound, the oxygen containing group of the reaction product being hydrogenated.

8. The process for the production of wax-like substances which comprises subjecting an oxidation product of a wax of mineral origin containing carboxylic acids to a condensing-splitting treatment in the liquid phase in the presence of a catalyst capable of splitting off carbon dioxide from organic oxygenated substances, thus forming direct carbon chains containing more carbon atoms than those of the initial oxygenated compound, the oxygen containing group of the reaction product being hydrogenated.

9. The process for the production of wax-like substances which comprises subjecting an oxidation product of paraffin wax containing carboxylic acids to a condensing-splitting treatment in the liquid phase in the presence of a catalyst capable of splitting off carbon dioxide from organic oxygenated substances, thus forming direct carbon chains containing more carbon atoms than those of the initial oxygenated compound, the oxygen containing group of the reaction product being hydrogenated.

10. The process for the production of wax-like substances which comprises subjecting train oil to a condensing-splitting treatment in the liquid phase in the presence of a catalyst capable of splitting off carbon dioxide from organic oxygenated substances, thus forming direct carbon chains containing more carbon atoms than those of the initial oxygenated compound, the oxygen containing group of the reaction product being hydrogenated.

11. The process for the production of wax-like substances which comprises subjecting train oil fatty acids to a condensing-splitting treatment in the liquid phase in the presence of a catalyst capable of splitting off carbon dioxide from organic oxygenated substances, thus forming direct carbon chains containing more carbon atoms than those of the initial oxygenated compound, the oxygen containing group of the reaction product being hydrogenated.

12. A white hard wax-like mass having a melting point of about 104° C. and an acid value and saponification value of about zero, obtainable by treating oxidized Montan wax with kieselguhr and iron powder at from about 310° to about 360° C. and hydrogenating the product in the presence of a nickel-kieselguhr catalyst under superatmospheric pressure.

13. A pale yellow wax-like substance having a melting point of about 68° C., an acid value of about zero and a saponification value of about 3, obtainable by hardening fatty acids from train oil with hydrogen under 200 atmospheres at about 110° C. in the presence of iron powder and a nickel catalyst, treating the product obtained at 270° C. and finally hydrogenating the product at the same temperature under a hydrogen pressure of 200 atmospheres.

14. A pale yellow wax-like mass having a melting point of about 75° C., an acid value and saponification value of about zero and a hydroxyl number of about 90, obtainable by treating seal oil under a hydrogen pressure of 20 atmospheres at 140° C. in the presence of a nickel catalyst, then adding iron powder and heating at 290° C. without the employment of hydrogen or pressure and then treating the mass with hydrogen under a pressure of about 200 atmospheres at about 185° C. in the presence of a nickel catalyst.

15. Wax-like non-crystallized mixtures having an acid value and saponification value of about zero, in the molecule of which all of the carbon atoms are directly connected to each other, capable of binding a benzine fraction boiling between 140 and 170° C. at normal temperature in amounts up to four times their own weight, obtainable by subjecting a mixture of aliphatic acyl compounds, in which the product of the number of carbon atoms multiplied by the number of acyl groups is at least 10, to a condensing splitting treatment in the liquid phase in the presence of a catalyst capable of splitting off carbon dioxide from organic oxygenated substances, whereby direct carbon chains containing more carbon atoms than those of the initial compounds are formed, and further subjecting the materials to a hydrogenation whereby the oxygen containing group of the products is hydrogenated.

16. Wax-like colorless non-crystallized substances having a melting point above 98° C. and an acid value and saponification value of about zero comprising mixtures of synthetically prepared compounds the carbon atoms in the molecules of the said compounds being directly connected to each other, obtainable by subjecting a mixture of aliphatic acyl compounds, in which the product of the number of carbon atoms multiplied by the number of acyl groups is at least 10, to a condensing splitting treatment in the liquid phase in the presence of a catalyst capable of splitting off carbon dioxide from organic oxygenated substances, whereby direct carbon chains containing more carbon atoms than those of the initial compounds are formed, and further subjecting the materials to a hydrogenation whereby the oxygen containing group of the products is hydrogenated.

17. Wax-like colorless non-crystallized substances having a melting point above 85° C. and an acid value and saponification value of about zero comprising mixtures of synthetically prepared compounds the carbon atoms in the molecules of the said compounds being directly connected to each other, obtainable by subjecting a mixture of aliphatic acyl compounds, in which the product of the number of carbon atoms multiplied by the number of acyl groups is at least 10, to a condensing splitting treatment in the liquid phase in the presence of a catalyst capable of splitting off carbon dioxide from organic oxygenated substances whereby direct carbon chains containing more carbon atoms than those of the initial compounds are formed, and further subjecting the materials to a hydrogenation whereby the oxygen containing group of the products is hydrogenated.

MICHAEL JAHRSTORFER.
GEORG SCHWARTE.